United States Patent [19]

Moerke

[11] Patent Number: 5,258,599
[45] Date of Patent: Nov. 2, 1993

[54] CONVERTIBLE ARC WELDING SYSTEM

[76] Inventor: Delford A. Moerke, 1020 Shady Oak Dr., North Mankato, Minn. 56001

[21] Appl. No.: 740,158

[22] Filed: Aug. 5, 1991

[51] Int. Cl.$^5$ .................... B23K 10/00; B23K 9/00
[52] U.S. Cl. ................... 219/121.48; 219/75; 219/121.51; 219/137.63; 219/121.45
[58] Field of Search ............... 219/136, 137.63, 137.9, 219/121.45, 121.46, 121.48, 121.51, 74, 75

[56] References Cited

U.S. PATENT DOCUMENTS

| | | | |
|---|---|---|---|
| 4,582,979 | 4/1986 | Moerke | 219/137.63 |
| 4,600,824 | 7/1986 | Moerke | 219/137.63 |
| 4,645,901 | 2/1987 | Scholz et al. | 219/121.5 |
| 4,939,339 | 7/1990 | Folkening et al. | 219/137.63 |

FOREIGN PATENT DOCUMENTS

0024582  2/1984  Japan ............... 219/137.63

OTHER PUBLICATIONS

D/F Machine Specialties, Inc. Instruction Manual 89-70 for "TIG" Welding Products.
Linde Air Products Catalog page for PT-8 Plasma Torch.
Airco manual for Electrode Adjustment Attachment Model HMA-B.

*Primary Examiner*—Mark H. Paschall
*Attorney, Agent, or Firm*—Emrich & Dithmar

[57] ABSTRACT

In a convertible TIG, MIG or plasma arc welding system, a cylindrical docking body mountable in a socket at a welding station, has utilities passages therethrough for receiving an elongated metal electrode, shielding and plasma gases, welding potential and cooling water. The electrode passage is threaded at one end to interchangeably mount any of a plurality of electrode feed assemblies for consumable wire or tungsten electrodes. An output fixture is mounted at the other end of the body to receive the electrode and the plasma or shielding gas and pass them from the body. A nozzle assembly is removably mountable on the other end of the docking body in surrounding relationship with the output fixture and the associated tip assembly and communicates with the shielding gas passage for passing shielding gas to the working end of the nozzle. The docking body has internal channels among the passages so as to circulate cooling water through both the output fixture and the nozzle assembly. The working end of the nozzle assembly interchangeably mounts any of a plurality of gas directing assemblies for directing gases relative to the arc. The system can be converted among TIG, MIG and plasma arc welding by simply changing the electrode feed assembly, the tip assembly and the gas directing assembly. Alternatively, the entire nozzle assembly can be replaced with one designed for TIG or MIG welding.

39 Claims, 7 Drawing Sheets

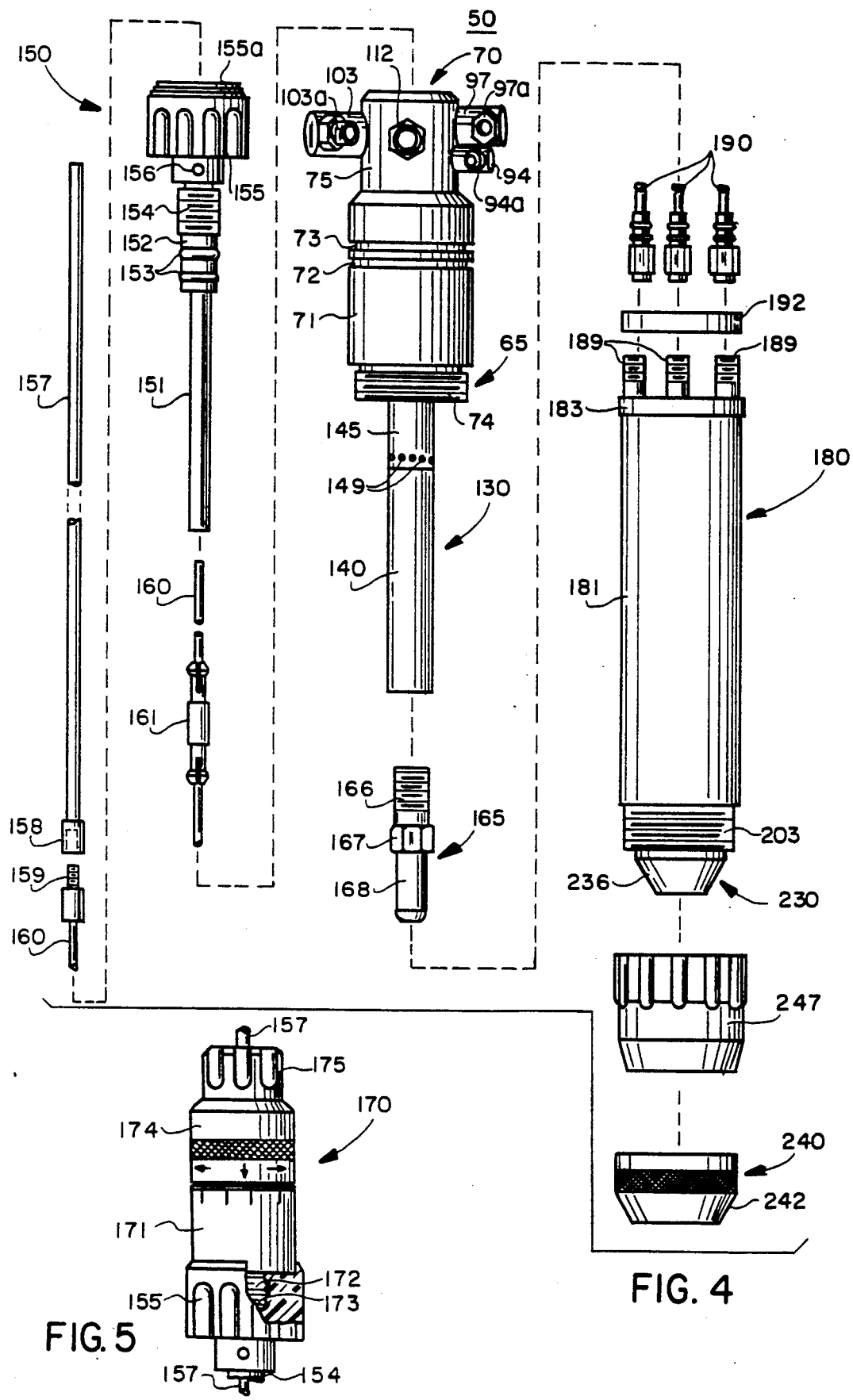

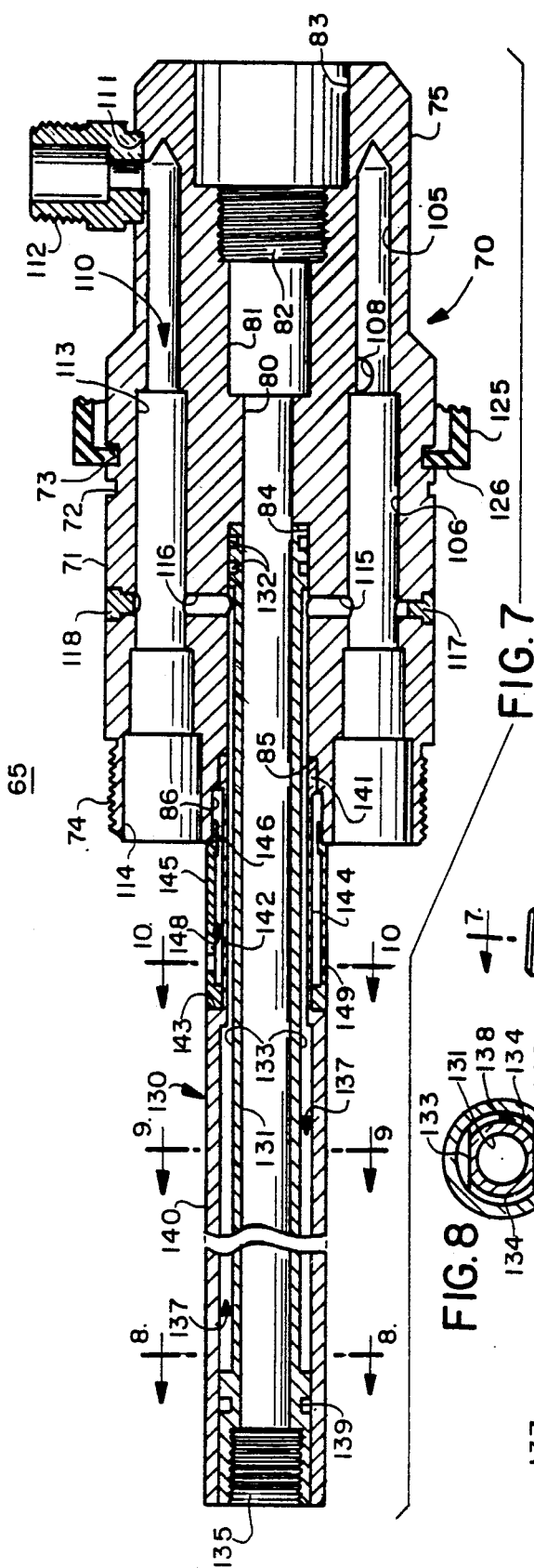

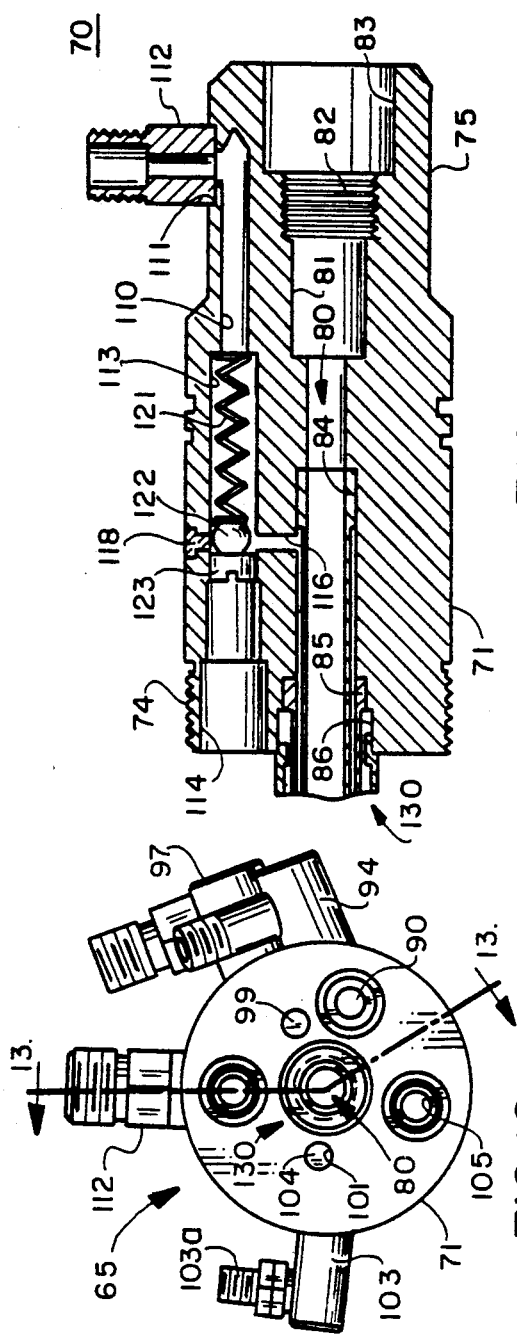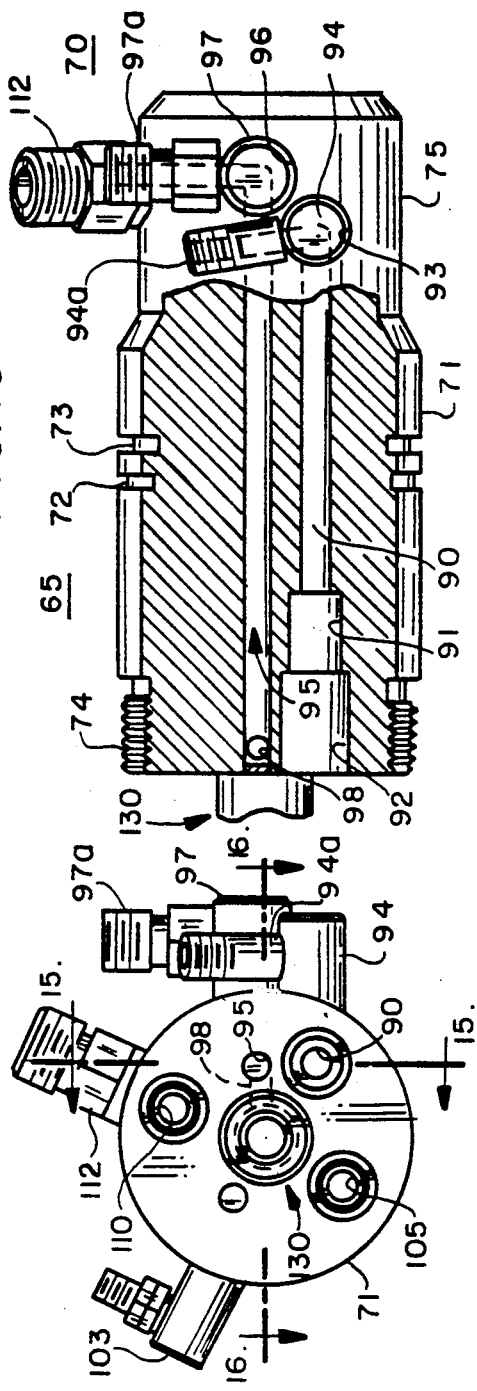

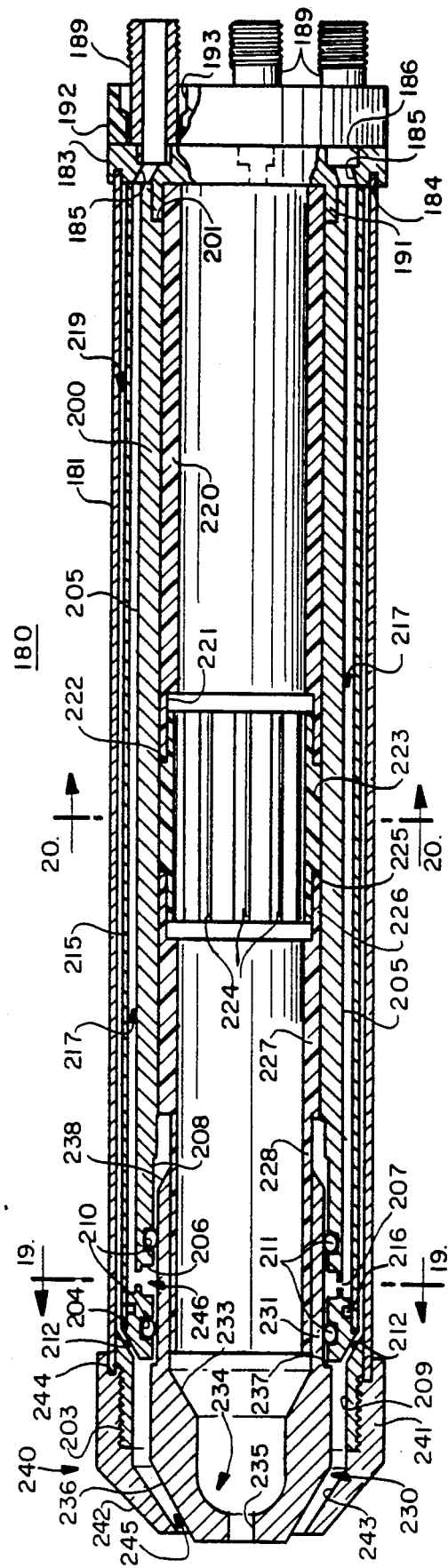
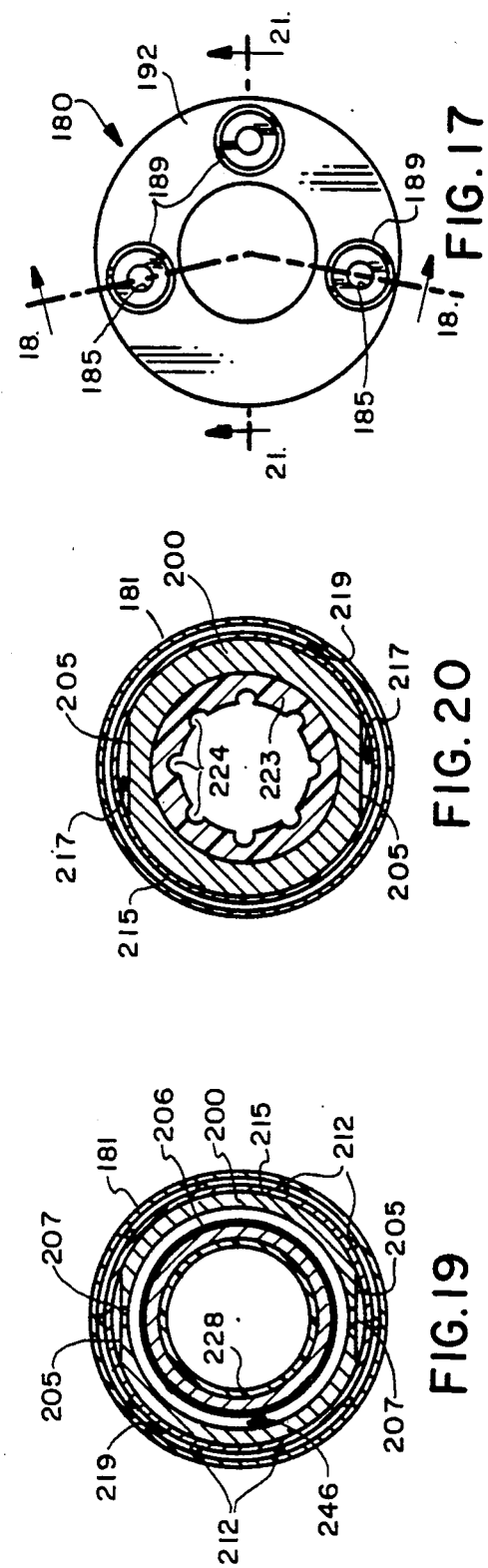
FIG. 18
FIG. 17
FIG. 20
FIG. 19

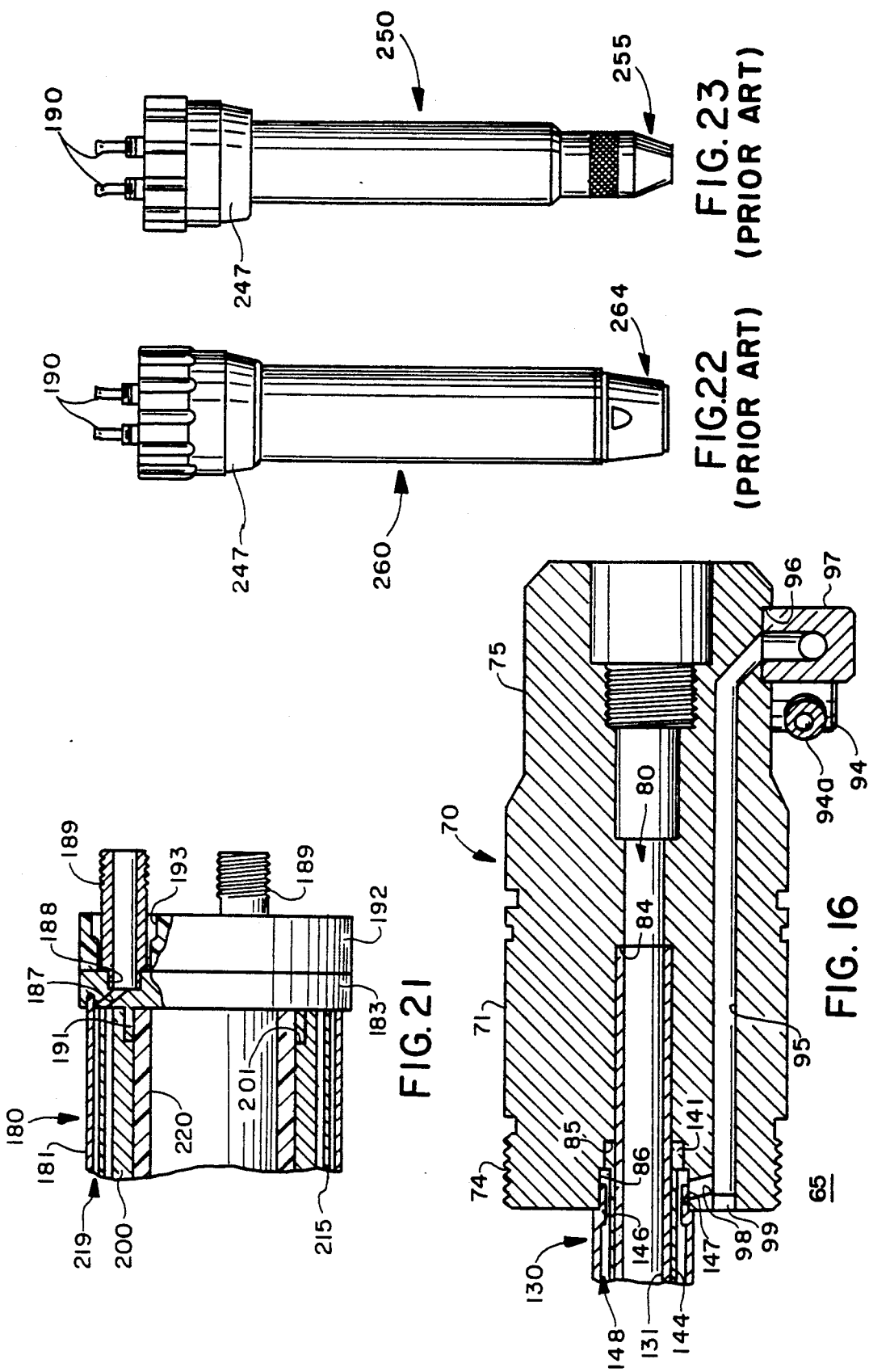

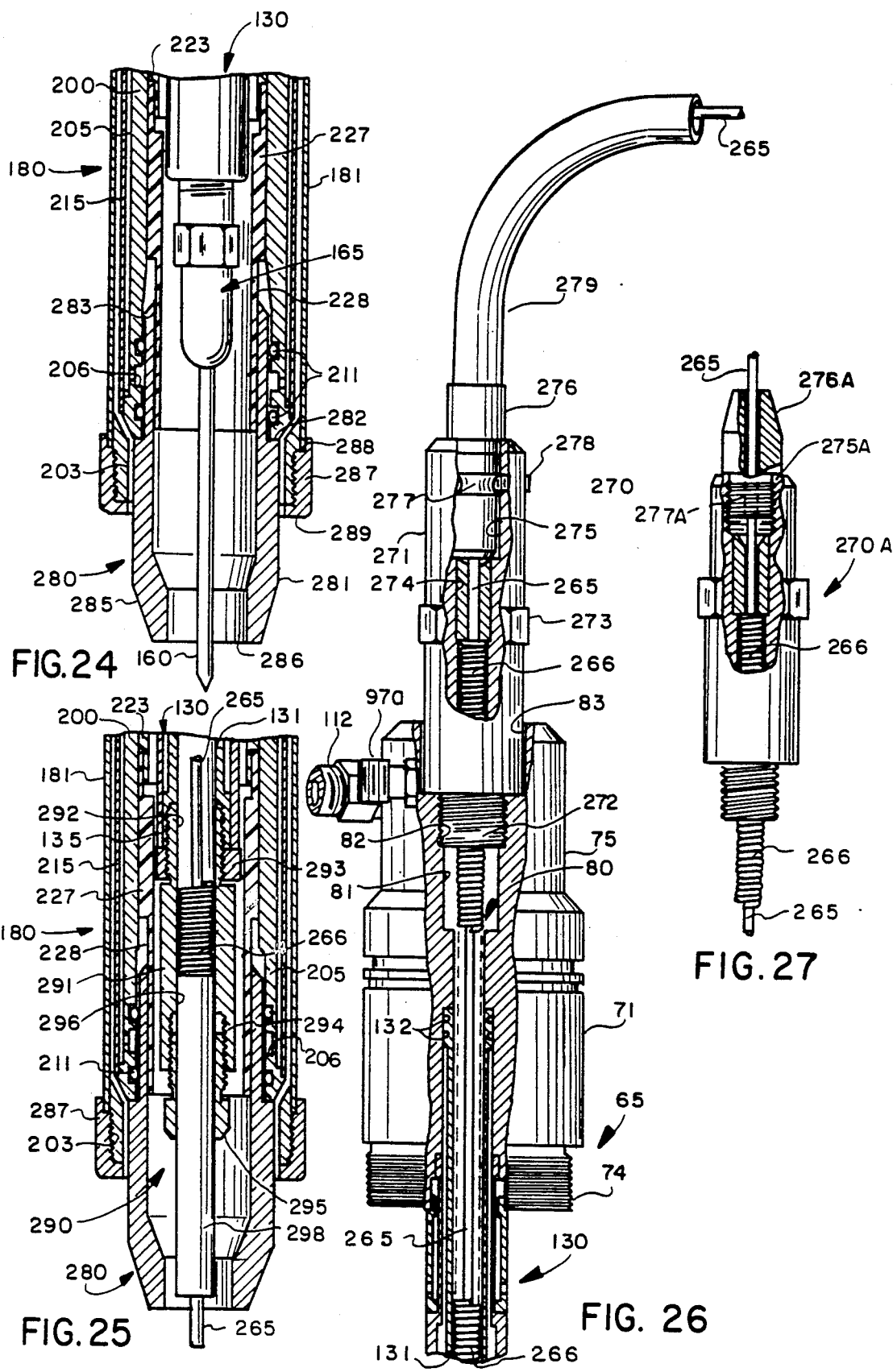

CONVERTIBLE ARC WELDING SYSTEM

BACKGROUND OF THE INVENTION

1. Field of the Invention

The present invention relates to welding apparatus and systems, specifically Plasma Arc Welding ("PAW"), Tungsten Inert Gas ("TIG") and Metal Inert Gas ("MIG") arc welding systems. The invention relates particularly to arc welding systems of the type utilized for mechanized and robotic welding applications.

2. Description of the Prior Art

Typically, each of PAW, TIG and MIG arc welding systems includes a welding torch assembly in which a wire electrode is disposed through a current pick-up tip which applies welding potential to the electrode. The torch assembly includes a main body or housing to which is removably mounted a welding nozzle which surrounds the pick-up tip and channels an inert shielding gas to the welding arc. The nozzle may be air or water cooled. In PAW welding the nozzle also channels a plasma gas to the welding arc. The welding torch assembly must be serviced with the utilities which it requires for operation, such as water for cooling, gas for shielding the welding arc, plasma gas in the case of PAW welding, electricity to effect the welding, and, in the case of MIG welding, a consumable wire electrode. All of these utilities are fed to the welding torch assembly from associated supplies via utilities delivery means which may include a portable utilities station of the general type disclosed in my U.S. Pat. No. 4,210,796.

Water cooled nozzle assemblies for each of PAW, TIG and MIG welding have been provided heretofore, but in prior water cooled nozzles the cooling has been provided only to the exterior portions of the nozzle assembly. There has been no provision for directly cooling the pick-up tip assembly, which is typically insulated from the external portions of the nozzle. Thus, very high temperatures experienced by the pick-up tip assembly, which is typically of copper, can result in annealing of the copper and consequent shortening of the life of the tip assembly.

Certain water-cooled PAW welding torches, such as that sold by Linde Air Products Company under Model No. PT-8, provide the cooling water to the distal or working end of the nozzle and provide a threaded orifice insert which defines the plasma arc orifice and which cooperates with the working end of the nozzle to define a cooling water cavity or passage. For this purpose, O-ring seals are provided between the orifice insert and the nozzle body to prevent the escape of cooling water. However, the orifice insert must be screwed in a predetermined distance in order to properly engage the seals and the user cannot tell when the orifice has been turned in a sufficient amount. The extent to which the orifice insert is screwed in will affect the nature of the resulting plasma arc. Thus, it is difficult for the user to know when the orifice insert has been properly positioned for both effective sealing and optimal arc performance.

When prior arc welding systems are to be utilized in mechanized or automated applications, the welding torch assembly is fixedly mounted on the automated welding control equipment. For example, the welding torch assembly may be mounted on a permanent fixed mount to which workpieces are delivered for welding or, alternatively, may be mounted on a movable mount, such as that of a robotic welding machine, which moves to the workpiece under remote control, and which may be pre-programmed.

In such prior, arc welding systems, the replacement of the welding torch assembly or parts thereof is extremely inconvenient and costly, particularly in the automated or robotic applications, entailing a replacement of the complete assembly, including all of the utilities delivery means. Furthermore, in robotic welding applications, the replaced welding torch assembly will not be in precisely the same location and orientation with respect to the robot unit as was the original assembly, necessitating recalibration.

In order to alleviate these replacement difficulties, I have provided in my U.S. Pat. No. 4,600,824 a docking assembly for an arc welding system, which permits the welding torch assembly to be easily manually replaced at the welding station without affecting the utilities delivery means upstream of the welding station, and without losing the precise positioning of the torch assembly in the system.

There are many occasions when only the nozzle assembly needs to be replaced, and not the entire torch assembly. While removable nozzle assemblies have been known in the prior art, removal was not easy, particularly in the case of water-cooled nozzles, wherein replacement entailed shut down of the water supply at the source to avoid extensive water spillage at the welding station. Thus, I have also provided in my U.S. Pat. No. 4,582,979, a docking assembly which permits ready mounting and demounting of a water-cooled welding nozzle assembly at the welding station without spillage of cooling fluid.

While my above-described docking assemblies are usable in both TIG and MIG welding applications, they are not usable in PAW welding applications, since their docking bodies make no provision for the supply of a plasma gas in addition to a shielding gas. Heretofore, there has been no provision for providing simple manual replacement of a PAW welding nozzle at the welding station.

While there are similarities among PAW, TIG and MIG welding operations, there are also significant differences. Thus, in TIG and MIG welding, only a shielding gas need be supplied, while PAW welding requires not only a shielding gas but also a plasma gas. Furthermore, the systems require different electrode feeds, since in MIG welding a wire electrode is relatively rapidly consumed and must be continuously fed, while in TIG and PAW welding a tungsten electrode is essentially fixed, although it must be occasionally adjusted and/or the tip must be reground to repair slow erosion. Because of these and other differences, heretofore each of the three types of arc welding, viz., PAW, TIG and MIG, has required a completely separate welding torch assembly. However, it is frequently necessary for a single user to utilize, at different times at a given welding station, each of the three different types of arc welding. In such cases, it is necessary for the user to obtain three completely separate welding torch assemblies, viz., PAW, TIG, and MIG, each of which represents a substantial investment. Furthermore, switching from one type of welding to another necessitates replacement of an entire torch assembly and/or utilities delivery system at considerable cost in time and manpower.

SUMMARY OF THE INVENTION

It is a general object of the present invention to provide an improved arc welding system which avoids the disadvantages of prior systems while affording additional structural and operating advantages.

An important feature of the invention is the provision of a docking assembly which permits a water-cooled PAW welding nozzle assembly to be mounted and demounted at a welding station, without affecting the utilities delivery means upstream of the welding station, and without leakage of cooling fluid.

In connection with the foregoing feature, another feature of the invention is the provision of a PAW welding nozzle assembly which is readily mountable and demountable at a welding station.

In connection with the foregoing feature, a still further feature of the invention is the provision of a nozzle assembly of the type set forth which has a removable gas-directing member which cooperates with the nozzle assembly to define a water cooling channel, and which can be readily and accurately mounted at a predetermined proper mounting position.

A still further feature of the invention is the provision of a docking body for use in a docking assembly of the type set forth.

In connection with the foregoing feature, another feature of the invention is the provision of a docking body of the type set forth which is provided with a water-cooled output fixture which carries and cools an electrode pick-up tip assembly, independently of the cooling of an associated nozzle assembly.

A still further feature of the invention is the provision of a docking body of the type set forth which permits the use of a number of manually interchangeable welding nozzle assemblies designed, respectively, for PAW, TIG and MIG welding.

Yet another feature of the invention is the provision of a welding system which is readily convertible among PAW, TIG and MIG welding configurations by simply interchanging at the welding station electrode feed and pick-up tip assemblies on the docking body and gas directing assemblies on the nozzle assembly.

Certain ones of these and other features of the invention are attained by providing in a plasma arc welding system including a tip assembly for guiding an elongated metal electrode toward an associated workpiece at a welding station and applying welding voltage to the electrode, a nozzle assembly surrounding the tip assembly for channeling a plasma gas and a shielding gas relative to the welding arc, and utilities delivery means for delivering to the welding station utilities such as welding voltage, arc plasma gas, arc shielding gas, and metal electrode, a quick connect and disconnect docking assembly comprising: a docking body disposed at the welding station and having utilities passages therethrough, means connecting the docking body to the associated utilities delivery means and receiving the electrode and the plasma and shielding gases into the passages, an output fixture carried by the docking body and communicating with selected ones of the passages for directing the electrode and plasma gas from the docking body, means on the output fixture for removably mounting the tip assembly thereon in a use configuration receiving the electrode with the output fixture providing an electrical connection between the docking body and the tip assembly, first coupling means on the docking body, second coupling means non-removably mounted on the nozzle assembly, the first and second coupling means being manually removably engageable with each other without the use of tools for mounting the nozzle assembly on the docking body in a mounted condition in surrounding relationship with the tip assembly and in communication with at least one other passage for receiving the plasma gas and the shielding gas, and means electrically insulating the docking body from the nozzle assembly, whereby the nozzle assembly can readily be mounted and demounted at the welding station without affecting the utilities delivery means upstream of the welding station.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 4 is an enlarged, exploded, side elevational view of the arc welding torch of FIG. 1;

FIG. 5 is an enlarged, fragmentary, side elevational view in partial section of the advance/retract unit for the electrode feed assembly of FIG. 2;

FIG. 6 is an enlarged bottom plan view of the docking assembly of the arc welding system of FIG. 1;

FIG. 7 is a further enlarged, fragmentary, sectional view, taken along the line 7—7 in FIG. 6, with the water valves removed and illustrating a portion of the protective hood for the docking assembly;

FIG. 8 is a sectional view taken along the line 8—8 in FIG. 7;

FIG. 9 is a sectional view taken along the line 9—9 in FIG. 7;

FIG. 10 is a sectional view taken along the line 10—10 in FIG. 7;

FIG. 11 is a sectional view taken along the line 11—11 in FIG. 6;

FIG. 12 is a view similar to FIG. 6;

FIG. 13 is a fragmentary, sectional view taken along the line 13—13 in FIG. 12;

FIG. 14 is a view similar to FIG. 6;

FIG. 15 is a fragmentary, sectional view, in partial elevation, taken along the line 15—15 in FIG. 14;

FIG. 16 is a further enlarged, fragmentary, sectional view taken along the line 16—16 in FIG. 14;

FIG. 17 is an enlarged top plan view of the PAW nozzle assembly of the welding torch of FIG. 1;

FIG. 18 is a sectional view, in partial elevation, taken along the line 18—18 in FIG. 17;

FIG. 19 is a sectional view taken along the line 19—19 in FIG. 18;

FIG. 20 is a sectional view taken along the line 20—20 in FIG. 18;

FIG. 21 is a fragmentary, sectional view, in partial elevation, taken generally along the line 21—21 in FIG. 17;

FIG. 22 is a side elevational view of a prior art MIG welding nozzle assembly mountable on the docking assembly of FIGS. 6 and 7;

FIG. 23 is a side elevational view of a prior art TIG welding nozzle assembly mountable on the docking assembly of FIGS. 6 and 7;

FIG. 24 is a further enlarged, fragmentary, sectional view in partial elevation of the lower end of the docking assembly and the nozzle assembly of FIG. 3, modified for TIG welding;

FIG. 25 is a view similar to FIG. 24, with the docking assembly and the nozzle assembly modified for MIG welding;

FIG. 26 is a further enlarged, fragmentary, side elevational view of the docking assembly of FIG. 3 modified with a wire feed adapter for MIG welding; and FIG. 27 is a side elevational view in partial section of an alternative wire feed adapter for use with the docking assembly of FIG. 26.

DESCRIPTION OF THE PREFERRED EMBODIMENTS

Figure 1:
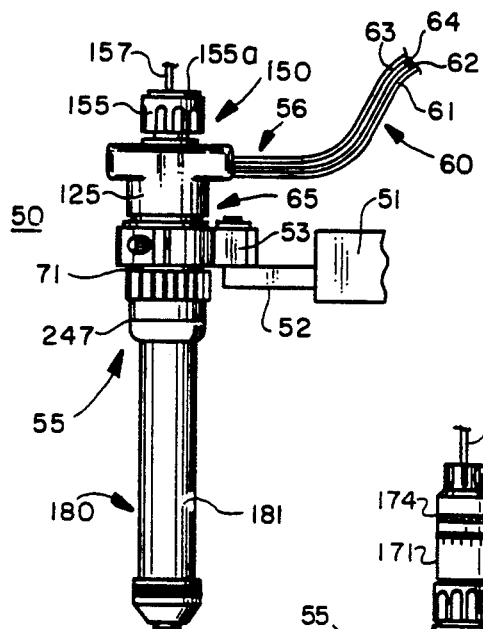
FIG. 1 is a fragmentary, side elevational view of an arc welding system incorporating a utilities delivery system, and a welding torch, coupled thereto constructed in accordance with the present invention, wherein the torch includes a docking assembly, a nozzle assembly for PAW welding, a manual top feed assembly for the tungsten electrode and a protective hood.
Figure 2:
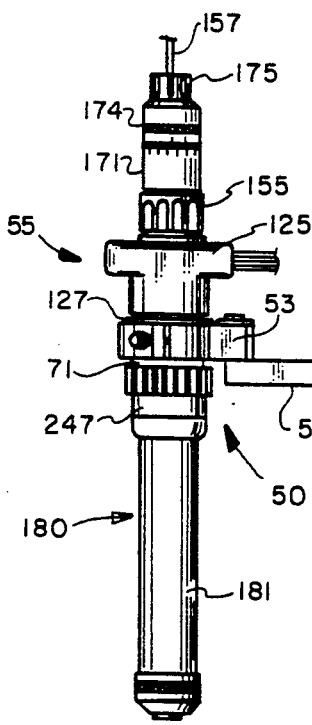
FIG. 2 is a view similar to FIG. 1, and illustrating an advance/retract unit on the tungsten electrode feed assembly.

Referring to FIGS. 1 and 2, there is illustrated an arc welding system, generally designated by the numeral 50, which incorporates an arc welding unit or torch 55, constructed in accordance with the present invention, and coupled to a utilities delivery system 60. The torch 55 comprises a docking assembly 65, an electrode feed assembly 150, a current pickup tip 165 (FIG. 3) and a nozzle assembly 180, the torch 55. As illustrated in FIGS. 1 and 2, is configured for PAW welding but, as will be explained in greater detail below, it is a fundamental aspect of the present invention that it can be readily reconfigured for TIG or MIG welding without movement of the docking assembly 65 and without disconnection from the utilities delivery system 60.

The arc welding system 50, as illustrated in FIGS. 1 and 2, is adapted for use in robotic welding applications. More specifically, an associated robot machine (not shown) of known construction has a robot arm 51 provided with an articulated wrist 52 at the distal end thereof, which carries a torch mounting bracket 53 in which the torch 55 is mounted for performing welding operations at a welding station 56. Typically, the robot arm 51 and the wrist 52 will move, under computer program control, as necessary to cause the welding torch 55 to follow a predetermined weld path along an associated workpiece (not shown). While the present invention has been disclosed as adapted for robotic welding, it will be appreciated that it could also be adapted for use with fixed or dedicated mechanized welding applications by use of an alternative fixed mounting arrangement, which may be generally of the type disclosed in my U.S. Pat. No. 4,582,979.

The utilities may be supplied to the welding torch 55 through the utilities delivery system 60 from a movable utilities station (not shown), which may be of the type disclosed in my U.S. Pat. No. 4,210,796. Typically, the utilities station is supported overhead on a boom or other structure carrying a manifold system, which may supply a plurality of utilities stations, one for each of a number of robot machines. Associated with the utilities station is a wire feeder (not shown) which feeds a consumable wire electrode for use in MIG welding, as will be described more fully below. The utilities delivery system 60 includes a number of conduits or hoses extending between the utilities station and the welding torch 55 for supplying fluid utilities thereto, including a water inlet hose 61 and a water drain hose 62 for circulating cooling water through the welding torch 55, a plasma gas hose 63 and a shielding gas hose 64. The water drain hose 62 may be embedded in a power cable which supplies electric power to the welding torch 55.

Referring now also to FIGS. 3, 4 and 6–16, the docking assembly 65 includes a docking or utilities distribution unit 70 which has a solid cylindrical metal docking body 71, which may be formed of brass. Formed in the outer surface of the body 71 is a circumferential groove 72 adapted to receive a resilient split positioning ring 127 (FIGS. 1 and 2), for a purpose to be explained more fully below. Also formed in the outer surface of the body 71 is a circumferential groove 73. The forward or output end of the body 71 is externally threaded, as at 74, and the body 71 has a reduced-diameter rear or inlet end 75. Referring in particular to FIG. 7, the body 71 has an axial bore or passage 80 extending therethrough, the bore 80 having successively larger-diameter counterbore portions 81, 82 and 83 at the rear or inlet end thereof with the counterbore portion 82 being internally threaded, and also having successively larger-diameter counterbore portions 84, 85 and 86 at the forward or outlet end thereof.

Referring in particular to FIGS. 14 and 15, the body 71 is also provided with a shielding gas passage 90 extending thereinto from the outlet end thereof parallel to the axis thereof and being provided with successively larger-diameter counterbore portions 91 and 92 at the outlet end. The passage 90 extends well into the reduced-diameter inlet end 75 of the body 71 and is there provided with a laterally outwardly extending side port 93 in which is disposed a fitting 94 coupled to an externally-threaded connector 94a which extends from the fitting 94 substantially perpendicular to the axis thereof for connection to the associated shielding gas hose 64 of the utilities delivery system 60.

Referring in particular to FIGS. 14 and 16, the body 71 is also provided with a plasma gas passage 95 which extends from the outlet end of the body 71 substantially parallel to the axis thereof and into the reduced-diameter inlet end 75 of the body 71, at which point it is provided with a laterally outwardly extending side port 96 in which is disposed a fitting 97 coupled to an externally-threaded connector 97a for providing communication between the plasma gas passage 95 and the associated plasma gas hose 63 of the utilities delivery system 60. A cross channel 98 (FIGS. 6 and 14–16) is disposed adjacent to the outlet end of the body 71 and provides communication between the plasma gas passage 95 and the counterbore portion 86 of the axial bore 80. The outlet end of the passage 95 is closed by a plug 99.

Referring now in particular to FIGS. 3, 6, 7 and 11, the body 71 is provided with a water inlet passage, generally designated by the numeral 100, which includes an elongated bore 101 extending into the body 71 from the outlet end thereof substantially parallel to the axis thereof. The bore 101 extends into the reduced-diameter inlet end 75 of the body 71 and there communicates with a laterally outwardly extending side passage 102 which communicates with a fitting 103 mounted on the body 71 and coupled to an externally-threaded connector 103a for providing communication between the bore 101 and the water inlet hose 61 of the utilities delivery system 60. The outlet end of the bore 101 is closed by a plug 104. The water inlet passage 100 also includes an elongated bore 105 which extends from the outlet end of the body 71 parallel to the bore 101 and is provided with a valve counterbore portion 106 and a larger-diameter outlet end counterbore portion 107. A laterally extending cross channel 108 extends inwardly from the outer surface of the body 71 and intersects the bores 101 and 105 for providing communication therebetween, the outer end of the cross channel 108 being closed by a plug 109.

Referring in particular to FIGS. 6, 7, 12 and 13, the body 71 is provided with an elongated water outlet passage 110 which extends from the outlet end of the body 71 substantially parallel to the axis thereof and well into the reduced-diameter inlet end 75 thereof, where it is provided with a laterally outwardly opening side port 111 in which is disposed an externally connector fitting 112 for providing communication between the passage 110 and the water drain hose 62 of the utilities delivery system 60. The passage 110 is provide with a valve counterbore portion 113 and a larger-diameter outlet end counterbore portion 114. As is best illustrated in FIGS. 6, 7 and 13, the body 71 is also provided with radially extending cross channels 115 and 116 which, respectively, provide communication between the valve counterbore portions 106 and 113 of the water inlet and outlet passages 100 and 110 and the counterbore portion 84 of the axial bore 80. The outer ends of the cross channels 115 and 116 are, respectively, closed by plugs 117 and 118.

The water inlet and outlet passages 100 and 110 are, respectively, provided in the counterbore portions 106 and 113 thereof with check valves 120 (see FIGS. 3, 11 and 13), which may be of the type disclosed in my U.S. Pat. No. 4,582,979. Thus, each of the valves 120 includes a helical compression spring 121 seated in the counterbore portion for resiliently urging a valve ball 122 against an annular seat 123, which is preferably threadedly engaged in a threaded portion (not shown) of the associated passage 100 or 110 for closing the passage.

Each of the fittings and connectors 94, 94a, 97, 97a, 103 and 103a may be formed of brass and may be secured to each other and to the body 71 by brazing. Similarly, the plugs 99, 104, 109, 117 and 118 may be formed of brass and may be brazed to the body 71. The fittings and connectors and the associated ends of the utilities hoses 61–64 are preferably enclosed adjacent to the docking body 71 by the sheath or hood 125 (FIGS. 1 and 2) which also covers the upper end of the docking body 71. The groove 73 in the body 71 is adapted to receive therein an annular lip 126 of the hood 125 (see FIG. 7) for attaching the hood 125 to the body 71. The hood 125 is preferably formed of a flexible electrically insulating material, such as rubber.

Fixedly secured to the docking body 71 at the outlet end thereof is an output fixture 130, which cooperates with the body 71 to form the inner body of the welding torch 55. Referring in particular to FIGS. 3, 4, 6–10 and 16 the output fixture 130 includes an elongated inner tube 131 which is preferably formed of copper and has a rear end having an outer diameter very slightly less than that of the counterbore 84 of the axial bore 80 of the docking body 71 and received coaxially therein and seated against the rear end thereof. The rear end of the inner tube 131 may be provided with circumferential grooves for brazing rings 132 to braze the inner tube 131 to the body 71. Formed along diametrically opposite sides of the inner tube 131 are elongated flats 133 which extend along most of the length of the inner tube 131 from a point just rearwardly of the cross channels 115 and 116 in the body 71. At the forward ends of the flats 133, the inner tube 131 is provided with a circumferential groove 134 (FIG. 8). The forward end of the inner tube 131 is internally threaded, as at 135, and has a slightly enlarged outer diameter which is provided in its outer surface with a circumferential groove for receiving a brazing ring to facilitate brazing, as at 139, to an outer tube 140, which is telescopically received over the inner tube 131 and may be formed of brass. It will be appreciated that the outer tube 140 and the body 71 cooperate With the flats 133 of the inner tube 131 to define a pair of elongated water channels 137, and cooperates with the circumferential grooves 134 to define arcuate channel portions 138 (see FIG. 8) providing communication between the water channels 137. The water channels 137 and the channel portions 138 cooperate to define a cooling water cavity within the output fixture 130.

The outer tube 140 has a reduced outer diameter rearward end 141 which is dimensioned to be seated in the counterbore 85 when the inner tube 131 is seated in the counterbore 84 of the axial bore 80, and which may be brazed to the body 71 (FIGS. 7 and 16). The rearward end 141 has a further reduced outer-diameter portion 142 which terminates at an annular shoulder 143 to define an annular groove 144 in which is seated a cylindrical gas sleeve 145 which has an outer diameter substantially the same as that of the outer tube 140. The gas sleeve 145 may be formed of brass and has one end thereof brazed to the shoulder 143 and is provided at the rearward end thereof with a reduced outer diameter portion 146 which is telescopically received within the counterbore 86 of the body 71 for brazing thereto. The reduced end 146 of the outer tube 140 is provided with an arcuate notch or cutout 147 adjacent to the inner end of the cross channel 98 to prevent obstruction thereof (see FIG. 16). The gas sleeve 145, except for the forwardmost portion thereof which abuts the shoulder 143, is spaced radially outwardly from the outer tube 140 for cooperation therewith to define an elongated circumferential gas channel 148, the gas sleeve 145 being provided with a plurality of equiangularly spaced-apart outlet holes 149 adjacent to the forward end of the channel 148 for delivering plasma gas from the output fixture 130, as will be explained in greater detail below.

Referring now to FIGS. 1, 2 and 4, the electrode feed assembly 150 of the welding torch 55 includes an elongated tubular shaft 151 having an enlarged-diameter portion 152 adjacent to its rear or inlet end which is provided at the forward portion thereof with circumferential grooves in which are respectively seated O-ring seals 153, and which is provided at its rearward end with external threads, as at 154. The rearmost end of the shaft 151 is coaxially received in a hub portion of a cylindrical knob 155 and is fixedly secured thereto by a suitable set screw 156 which is preferably tipped with an electrically insulating material such as nylon to prevent high-frequency leakage. The knob 155 is preferably formed of an electrically insulating material and has an axial bore therethrough with an enlarged counterbore portion at its rear end closable by a cap 155a (FIG. 1). An elongated extension rod 157, which may be formed of a suitable electrically insulating material, extends through the hollow shaft 151 and the cap 155 and through a complementary axial opening in the cap 155a, the forward end of the extension rod 157 being provided with an internally threaded coupler 158 which is threadedly engageable with an externally threaded coupler 159 fixed to one end of an elongated metal electrode 160, which is preferably formed of tungsten. The electrode 160 extends coaxially through a double-ended collet 161.

Figure 3:
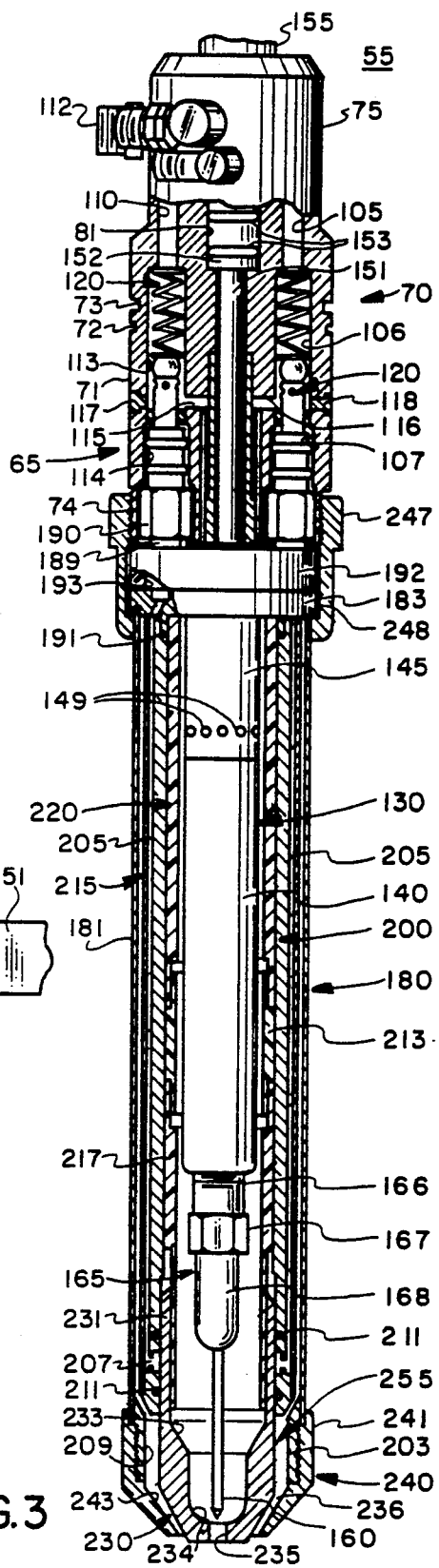
FIG. 3 is an enlarged elevational view in partial vertical section of the docking assembly and associated nozzle assembly of the torch of FIGS. 1 and 2.

Referring to FIGS. 3 and 4, the current pickup tip 165 of the welding torch 55 is a tubular member, preferably formed of copper, which has an externally threaded rear end 166 which is threadedly engageable in the inner tube 131 at the forward end of the output fixture 130. The tip 165 may be provided with a nut portion 167 to facilitate mounting and demounting on the output fixture 130, and a rounded forward tip end 168. The tip 165 is of known construction and the bore therethrough has a frustoconical inlet portion (not shown) against which one end of the collet 161 seats in use. The other end of the collet 161 seats against a frustoconical portion (not shown) at the outlet end of the bore through the shaft 151.

In use, the electrode 160 is coupled to the extension rod 157, the collet 161 is fitted over the electrode 160, and the rear end of the extension rod 157 is inserted into the forward end of the shaft 151 until it projects beyond the knob 155. The entire electrode feed assembly 150 is then inserted into the axial bore 80 of the docking assembly 65 from the rear or entry end thereof, with the electrode 160 extending through the output fixture 130 and the tip 165, and the threaded portion 154 is threadedly engaged with the internally threaded counterbore 82 of the axial bore 80 (see FIG. 7) until the collet 161 is trapped between the shaft 151 and the tip 165. If the knob 155 is then backed off a portion of a turn, the electrode 160 and the extension rod 157 will be freely manually movable axially of the welding torch 55 so that the user can manually adjust the position of the electrode 160 until the tip thereof is disposed at the desired welding position, as will be explained in greater detail below. Then, while the user holds the extension rod 157 to maintain this position, the knob 155 is tightened to clamp the collet 161 against the electrode 160 and prevent further axial movement of the electrode 160 and the extension rod 157. It will be appreciated that this top load electrode feed arrangement permits simple manual adjustment of the electrode position from an easily accessible location above the welding torch 55 without removal or disassembly of any of the parts thereof.

Referring to FIG. 5. there is illustrated an advance/retract mechanism 170 which may be used with the electrode feed assembly 150 to provide a more precise adjustment of the electrode position. The advance/retract mechanism 170 includes an indexing body 171 having an externally threaded tip 172 which is threadedly engageable with an internally threaded counterbore portion 173 of the bore through the knob 155 when the cap 155a thereof is removed. The indexing body 171 is coupled to a knurled body 174 provided at its upper end with a rotatable knob 175. The advance/retract mechanism 170 has an axial bore therethrough which receives the extension rod 157. The knob 175 is threadedly engaged in the knurled body 174 and constitutes a collet which grips the extension rod 157 when the knob 175 is advanced into the knurled body 174. The knurled body 174 is rotatable with respect to the indexing body 171, both bodies being provided with cooperating indicia to assist in selecting the precise amount of adjustment desired.

In use, the knob 155 is backed off at least a full turn so that the electrode 160 slides freely in the collet 161, and the knob 175 is backed off so that it is free of the extension rod 157. The knurled body 174 is rotated to a zero position relative to the indexing body 171. The electrode 160 is manually adjusted to a nominal working position and then the knob 175 is tightened to grip the extension rod 157. Then, while the indexing body 171 is manually held, against rotation, the knob 155 is advanced to tighten the collet 161 on the electrode 160. The assembly is now locked in the nominal working position. If adjustment of the electrode position is later required, such as to compensate for erosion of the tip thereof during welding, the knob 155 is loosened while the indexing body 171 is manually held, to release the electrode 160. Then, the position of the electrode may be advanced or retracted the desired amount by appropriate rotation of the knurled body 174, whereupon the electrode 160 may be again locked in place by retightening of the knob 155 while the indexing body 171 is manually held.

The nozzle assembly 180 is designed to channel the flow of plasma and shielding gases to the region of the welding arc, and is adapted to be removably mounted on the docking assembly 65. Referring in particular to FIGS. 3, 4 and 17-21, the nozzle assembly 180 includes an outer tubular body 181, which may be formed of brass. The rear or inlet end of the outer body 181 is received in an annular groove 184 in an end cap 183 and may be secured thereto by brazing. The end cap 183 has a pair of water passages 185 extending therethrough, each being provided at its entry end with an enlarged counterbore portion 186 (FIG. 18). Also formed through the end cap 185 is a gas passage 187 (FIG. 21) which has an enlarged counterbore portion 188. Three externally threaded connectors 189 are respectively fitted in the counterbore portions 186 and 188 and are fixedly secured to the end cap 183, as by brazing, the connectors 189 projecting rearwardly from the end cap 183 parallel to the axis of the tubular body 181 for threaded connection, respectively, to three transfer fittings 190 (see FIGS. 3 and 4). The forward surface of the end cap 183 is provided with a depending cylindrical flange 191 which projects into the outer tubular body 181 coaxially therewith. A cylindrical collar 192, formed of electrically insulating material, is disposed against the rear surface of the end cap 183 and is provided with three bores 193 therethrough for respectively receiving the connectors 189.

The nozzle assembly 180 also includes an inner tubular body 200, preferably formed of copper, which is telescopically received within the outer tubular body 181 and has a counterbore 201 at its inlet end which receives the cylindrical flange 191 of the end cap 183 and may be brazed thereto. The inner tubular body 200 has an enlarged outer diameter forward end 202 which has an externally threaded distal end portion 203 and defines a shoulder 204. Formed in the outer surface of the inner tubular body 200 at substantially diametrically opposed locations thereon are two elongated flats 205 which extend from the rear end of the inner tubular body 200 substantially to the enlarged-diameter distal end 202 thereof. Formed in the inner surface of the inner tubular body 200, adjacent to the forward ends of the flats 205, is a circumferential groove 206 which is provided with two radially outwardly extending ports 207, which respectively extend through to the flats 205. The inner tubular body 200 is provided at its forward end with two successively larger diameter counterbores 208 and 209, the former extending rearwardly well beyond the groove 206. Also formed in the inner surface of the counter bore 208 of the inner tubular body 200, respectively just forwardly and rearwardly of the groove 206, are two circumferential grooves 210 in which O-ring seals 211 are respectively seated. A plurality of circumferentially spaced-apart gas ports 212 (FIGS. 18 and 19) extend through the inner tubular body 200, each of the ports 212 having its outer end disposed on the shoulder 204 and its inner end disposed at the rearward end of the counterbore 209, so that the ports 212 converge forwardly of the nozzle assembly 180.

The nozzle assembly 180 also includes an intermediate tubular body 215 disposed between the inner and outer tubular bodies 181 and 200, coaxially therewith. The rearward end of the tubular body 215 abuts the inner surface of the end cap 183 radially just outside the forward ends of the water passages 185, while the forward end of the tubular body 215 abuts the shoulder 204 of the inner tubular body 200, the latter having a circumferential groove in its outer surface just rearwardly of the shoulder 204 in which is disposed a brazing ring for brazing the inner tubular body 200 to the intermediate tubular body 215, as at 216 (FIG. 18). Preferably, the inner diameter of the intermediate tubular body 215 is very slightly greater than the outer diameter of the inner tubular body 200 so as to fit snugly telescopically thereover. In this regard, it will be appreciated that the intermediate tubular body 215 cooperates with the flats 205 on the inner tubular body 200 to respectively define elongated water channels 217. The intermediate tubular body 215 is spaced radially inwardly from the outer tubular body 181 for cooperation therewith to define an annular shielding gas passage 219 which communicates at the rear end thereof with the gas passage 18 in the end cap 183, and at the front end thereof with the gas ports 212 through the inner tubular body 200 (FIGS. 18 and 19).

Disposed coaxially within the inner tubular body 200 at the rear end thereof is a hollow cylindrical rear insulator 220 having a counterbore 221 at the forward end thereof, which forward end is seated against an annular shoulder 222 along the rear end of a hollow, generally cylindrical diffuser sleeve 223, which is also disposed coaxially within the inner tubular body 200 (FIGS. 18 and 20). The diffuser sleeve 223 has formed in the inner surface thereof a plurality of equiangularly spaced apart, part-cylindrical grooves 224, each extending the length thereof. The outer surface of the diffuser sleeve 223 has a reduced diameter portion at its forward end which defines an annular shoulder 225 and is telescopically received within a counterbore portion 226 of a hollow cylindrical front insulator 227, so that the rear end of the insulator 227 is seated against the shoulder 225. The front insulator 227 has a reduced outer diameter forward end 228. The insulators 220 and 227 and the diffuser sleeve 223 are all formed of suitable electrically insulating material, such as a silicone glass material or a PTFE material of the type sold under the trademark "Teflon". The combined assembled length of the insulators 220 and 227 and the diffuser sleeve 223 is such that they line the inner surfaces of the end cap flange 191 and the inner tubular body 200 from the inner surface of the end cap 183 substantially to the counterbore 209 of the inner tubular body 200.

The nozzle assembly 180 also concludes a constricting nozzle 230, which is preferably formed of copper and has a relatively thin-walled cylindrical rear end 231 which fits telescopically between the reduced-diameter front end 228 of the front insulator 227 and the counterbore 208 of the inner tubular body 200. The thickness of the rear end 231 is such that it engages the O-ring seals 211 in fluid-tight sealing relationship. The constricting nozzle 230 has a frustoconical, forwardly converging, inner wall 233 and a rounded nose cavity 234 provided with a cylindrical exit port 235 axially thereof. The constricting nozzle 230 also has a frustoconical outer surface 236 at the front end thereof. The rear end 231 of the constricting nozzle 230 has a slightly reduced outer diameter defining an annular shoulder 237 at the forward end thereof (FIG. 18) and is provided with a bevel 238 at its rearward end. In use, the rear end 231 is push-fitted into place until the annular shoulder 237 seats against the inner tubular body 200 at the rearward end of the counterbore 209 thereof, insertion being facilitated by the bevel 238.

The nozzle assembly 180 is also provided with a cylindrical gas directing nozzle 240, which has an internally threaded rear end 241 threadedly engageable with the threaded portion 203 of the inner tubular body 200. The nozzle 240 has a tapered front end 242 which includes a frustoconical inner wall 243. The rearward end of the nozzle 240 is counterbored to define an annular shoulder 244 which seats against the outer tubular body 181 when the nozzle 240 is mounted in place. It will be appreciated that the constricting nozzle 230 and the gas directing nozzle 240 are so dimensioned that the outer surfaces of the former are spaced radially inwardly from the inner surface of the threaded portion 203 of the inner tubular body 200 and from the tapered inner surface 243 of the gas directing nozzle 240 for cooperation therewith to define an annular passage 245, which communicates with the gas ports 212 through the inner tubular body 200. It will be appreciated that the outer surface of the rear end 231 of the constricting nozzle 230 cooperates with the O-ring seals 211 and with the annular groove 206 on the inner surface of the inner tubular body 200 to define an annular water channel 246 which communicates with the water channels 217 to provide a circulating path for cooling water through the nozzle assembly 180.

The nozzle assembly 180 is also provided with a nut 247 which encircles the outer tubular body 181 and is provided at its forward end with a radially inwardly extending retaining flange 248 (FIG. 3), which has an inner diameter less than the outer diameters of the end cap 183 and the gas directing nozzle 240 to trap the nut 247 on the nozzle assembly 180. It will be appreciated that the nozzle assembly 180 may be mounted on the docking assembly 65 by fitting the nozzle assembly 180 telescopically over the output fixture 130 until the insulator collar 192 is flush against a forward end of the docking body 71, with the transfer fittings 190 being respectively received in the forward ends of the shielding gas passage 90, the bore 105 of the water inlet passage 100 and the water outlet passage 110, as is best illustrated in FIGS. 3 and 4. The nut 247 is then threadedly engaged with the externally threaded end 74 of the docking body 71 to lock the nozzle assembly 180 in place. Preferably, the nut 247 is formed of an electrically insulating material or is provided with an electrically insulating outer sheath. Thus, it will be appreciated that by the combined action of the insulator collar 192, the insulators 220 and 227, the gas diffuser sleeve 223 and the nut 247, the outer surfaces of the nozzle assembly 180 are completely electrically insulated from the electrically hot docking body 71. Therefore, the user may mount and demount the nozzle assembly 180 without fear of electrical shock.

The operation of the arc welding system 50 for PAW welding will now be described in detail. Initially, the docking unit 70 is coupled to the hoses 61-64 of the utilities delivery system 60 by the connectors 94a, 97a, 103a and 112, and the hood 125 is fitted around the body 71. Then, the threaded end 74 of the body 71 is dropped into the torch mounting bracket 53, the positioning ring 127 engaging the top of the mounting bracket 53 to limit the depth of insertion of the body 71 therein. This accurately positions the docking body 71 with respect to the robot wrist 52 and, therefore, with respect to the associated workpiece. The mounting bracket 53 is securely tightened about the docking body 71. The electrical pickup tip 165 may be mounted in the output fixture 130 either before or after mounting of the docking unit 70 on the mounting bracket 53.

The docking assembly 65 is now ready for mounting of the nozzle assembly 180. In this regard, it is a fundamental aspect of the present invention that the nozzle assembly 180 can be quickly and easily manually mounted and demounted with respect to the docking unit 70, without the use of tools, as was described above. In this regard, the transfer fittings 190 cooperate with the corresponding passages in the docking body 71 to form plug-and-socket type couplings, the largest counterbore portions 92, 107 and 114 of the passages accommodating the hexagonal portions of the transfer fittings 190. The transfer fittings 190 are of the type disclosed in my aforementioned U.S. Pat. No. 4,582,979 and, as is explained therein, include 0-ring seals which cooperate with the associated passages in the docking body 71 to form a fluid-tight coupling. The distal ends of the transfer fittings 190 form actuator tips which, respectively, are received through the annular seats 123 of the check valves 120 for depressing the balls 122 against the urging of the compression springs 121, thereby to open the check valves 120 and permit the free flow of water through the passages 100 and 110, as is best illustrated in FIG. 3.

When the nozzle assembly 180 has been mounted on the docking body 71, as described above, the electrode 160 is positioned by use of the electrode feed assembly 150, either manually or by use of the advance/retract mechanism 170 of FIG. 2, in the manner described above, until the tip of the electrode 160 is positioned in a nominal PAW welding position just inside the constricting nozzle 230, as illustrated in FIG. 3. Electrical power is transferred to the electrode 160 through the electrical pickup tip 165, in a known manner.

Plasma gas flows through the gas passage 95 in the docking body 71, and then through the cross channel 98 into the gas channel 148 in the gas sleeve 145 of the output fixture 130 (FIG. 16). The plasma gas exits the output fixture 130 through the outlet holes 149 in the gas sleeve 145 and then flows forwardly inside the nozzle assembly 180 along the outer surface of the output fixture 130, through the grooves 224 in the diffuser sleeve 223 and into the constricting nozzle 230, where it cooperates with the electrode 160 to form the plasma welding arc which extends through the exit port 235 to the workpiece, in a known manner.

The shielding gas flows through the gas passage 90 in the docking body 71 and thence through the associated one of the transfer fittings 190 and the gas passage 187 in the end cap 183 (FIGS. 15 and 21). The shielding gas then flows forwardly through the annular gas passage 219 in the nozzle assembly 180, through the ports 212 and then through the passage 245 between the constricting nozzle 230 and the gas directing nozzle 240 to surround the plasma arc in a known manner (FIGS. 3 and 18).

The cooling water flows from the utilities delivery system 60 into the water inlet passage 100 and, more specifically, into the bore 105 in the docking body 71 (FIG. 11). The water then flows through cross channel 108 into the bore 105, through the open check valve 120 and the associated transfer fitting 190 and the corresponding one of the water passages 185 through the end cap 183 of the nozzle assembly 180 (FIG. 18). The water then flows down along the associated water channel 217 along one side of the nozzle assembly 180, circumferentially through the water channel 246 adjacent to the forward end of the nozzle assembly 180, and thence back up the other water channel 217, through the associated transfer fitting 190 and into the water outlet passage 110 through the open check valve 120 (FIGS. 3, 7 and 13) to the water drain hose of the utilities delivery system 60. Thus, it will be appreciated that a continuous flow of cooling water is circulated along substantially the entire length of the nozzle assembly 180. In this regard, it will be appreciated that, because the constricting nozzle 230 is preferably formed of a very good thermal conductor, such as copper, the contact of the cooling water with the rear end 231 of the constricting nozzle 230 at the circumferential water channel 246 effectively serves to cool the constricting nozzle 230. In like manner, it will be appreciated that cooling of the copper gas directing nozzle 240 is effected by conduction through the externally threaded portion 203 of the inner tubular body 200.

It is a significant aspect of the present invention, that it effects direct cooling, not only of the nozzle assembly 180, but also of the output fixture 130. Thus, a portion of the incoming cooling water flowing through the bore 105 of the water inlet passage 100 passes through the cross channel 115 into the corresponding one of the water channels 137 extending forwardly along one side of the output fixture 130 (FIG. 7), and thence through the circumferential channel portion 138 (FIG. 8) and back out the other water channel 137, through the cross channel 116 and into the water outlet passage 110 of the docking body 71. Accordingly, it will be appreciated that cooling water is circulated through almost the entire length of the output fixture 130 and, because the inner tube 131 and the pickup tip 165 are formed of a good thermally conducting material, such as copper, effective cooling of the pickup tip 65 is achieved.

It is a fundamental aspect of the present invention that the arc welding system 50 can be easily converted from PAW welding to TIG or MIG welding without disconnection of the welding torch 55 from the utilities delivery system 60. One such conversion can be effected by removing the nozzle assembly 180 and substituting therefor a different type of nozzle assembly. Thus, for example, if the user wishes to switch from PAW to TIG welding, he need only disconnect the nozzle assembly 180 by pulling it free of the docking body 71 after unscrewing the nut 247, and then mounting a known type of water-cooled TIG nozzle, such as the nozzle 250 illustrated in FIG. 23, which is of a type manufactured by D/F Machine Specialties, Inc. The TIG nozzle 250 has a nut 247 for threaded engagement with the docking body 71, as described above. Since only one gas is used in TIG welding, the TIG nozzle 250 has only two of the transfer fittings 190, for respective reception in the water passages of the docking body 71. The supply of shielding gas from the utilities delivery system may, therefore, be turned off, and shielding gas is now supplied through the plasma gas hose 63 of the utilities delivery system 60, which then follows the same path through the docking body 71 and the output fixture 130, as was described above for the plasma gas. In this regard, it will be appreciated that the shielding gas and the plasma gas may be the same type of gas. The shielding gas flows down through the nozzle 250 along the outside of the output fixture 130 through a gas directing nozzle 255 which directs it around the welding arc in a known manner. In TIG welding, the electrode 160 typically projects a slight distance beyond the end of the nozzle 255. Thus, appropriate adjustment of the position of the electrode 160 can be effected with the electrode feed assembly 150, as explained above.

In the event that the user wishes to perform MIG welding, he can substitute a known type of MIG nozzle, such as the nozzle 260 illustrated in FIG. 22, which is of the type disclosed in my aforementioned U.S. Pat. No. 4,582,979. This is a water-cooled nozzle which, again, only has two of the transfer fittings 190, since only a single gas is used. This shielding gas will be directed in the same manner as was described above for the TIG welding nozzle 250. MIG welding uses a consumable wire electrode 265 (see FIGS. 25-27) and is typically provided with a wire liner 266 in the form of a helical coil which surrounds the electrode wire 265. Thus, before mounting the nozzle 260, it is also necessary to replace the electrode feed assembly 150 with a wire feed adapter 270, as illustrated in FIG. 26, and utilize a MIG contact tip assembly 290 (FIG. 25) in place of the electrical pickup tip 165. Accordingly, the electrode feed assembly 150 (FIGS. 1 and 4) is removed from the welding torch 55 by essentially reversing the assembly instructions described above, which can be effected without moving the docking assembly 65 relative to the robot arm 51 or disconnecting it from the utilities delivery system 60.

The MIG contact tip assembly 290 may be of the type disclosed in my aforementioned U.S. Pat. No. 4,582,979, and includes a collet adapter 291 having an externally threaded rear end 292 which is threadedly received in the distal end of the output fixture 130 and is locked in position by a jam nut 293. The forward end of the collet adapter 291 is internally threaded, as at 294, and receives therein the externally threaded end 296 of a collet nut 295. A tubular contact tip 298 is slip-fitted into the front end of the collet nut 295 and the collect adapter 291 to the desired depth. It will be appreciated that, as the collet nut 295 is threaded into the collet adapter 291, it clamps the contact tip 298 in place, in a known manner.

The wire feed adapter 270 has a cylindrical body 271 which is receivable in the input counterbore 83 of the axial bore 80 through the docking body 71, the body 271 having a reduced-diameter externally threaded tip 272 which is threadedly engageable in the threaded counterbore 82 of the docking body 71 (see FIG. 26), this threaded engagement being facilitated by a nut portion 273 on the body 271. The body 271 has an axial bore 274 therethrough which has an enlarged counterbore 275 at the entry or rear end thereof which receives an insert fitting 276, having a circumferential groove 277 in the outer surface thereof for receiving a set screw 278 to lock it in place in the body 271. The insert fitting 276 is coupled to the outlet end of a flexible tube 279 through which the wire electrode 265 is fed from an associated wire feed mechanism (not shown) of known type. The rear end of the wire liner 266 is preferably captured in a suitable fitting which is received in the bore 274 of the body 271 and abuts the forward end of the insert fitting 276. The wire liner 266 projects from the forward end of the body 271 and has a length such that, when the body 271 is mounted in place on the docking body 71, the forward end of the wire liner 266 will extend through the docking body 71 and the output fixture 130 and abut the rear end of the contact tip 298 (FIGS. 25 and 26).

The wire feed adaptor 270 is designed for use in robotic applications. In fixed mount applications, mentioned above, the wire feed adaptor 270 may be replaced with a direct mount adapter 270A (FIG. 27), which is similar to the adapter 270 except that it has an internally threaded enlarged entry end 275A which receives an externally threaded end 277A of an inlet fitting 276A through which the wire electrode 265 is fed.

It is another significant aspect of the invention that the conversion among PAW, TIG and MIG welding can be effected without substitution of the entire nozzle assembly 180. Thus, for example, if a user wishes to convert from PAW to TIG welding, instead of replacing the entire nozzle assembly 180 with the TIG nozzle 250, he may simply remove the constricting nozzle 230 and the gas directing nozzle 240, and replace them with a TIG gas nozzle 280 and a blind nut 287, respectively. Thus, referring, to FIGS. 3, 18 and 24, the gas directing nozzle 240 is unscrewed from the nozzle assembly 180 and the constricting nozzle 230 is pulled out of the end of the nozzle assembly 180. The TIG gas nozzle 280 has a main cylindrical body 281 which is provided with an annular shoulder 282 in its outer surface to define a reduced thickness rearward end 283 which is inserted into the nozzle assembly 280 between the front insulator 227 and the inner tubular body 200 until the shoulder 282 abuts the inner tubular body 200, in the same manner as was described above with the constricting nozzle 230. The main cylindrical body 281 may be provided with knurling (not shown) on its outer surface to facilitate handling. The main cylindrical body 281 has a forwardly converging tapered front end 285 with a relatively large-diameter, circularly cylindrical exit opening 286 therein through which the electrode 160 extends. The blind nut 287 is threaded onto the externally threaded end 203 of the inner tubular body 200 to cover the threads for cosmetic purposes, the blind nut 287 having a counterbore 288 at its rearward end which receives the front end of the outer tubular body 181, and is provided at its forward end with a radially inwardly extending flange 289 which abuts against the distal end of the external threaded portion 203 of the inner tubular body 200.

For conversion to MIG welding, in addition to substituting the TIG gas nozzle 280 and the blind nut 287 for the constricting nozzle 230 and the gas directing nozzle 240, the user must also substitute the MIG contact tip assembly 290 for the current pickup tip 165, and substitute the wire feed adapter 270 for the electrode feed assembly 150, as was described above.

Thus, it will be appreciated that a single user can equip himself for rapid and easy conversion among PAW, TIG and MIG welding, without the use of tools, and without disconnection of his welding torch from the utilities. In order to do this, he need only have the docking assembly 65 and the nozzle assembly 180, the electrode feed assembly 150, with or without the advance/retract mechanism 170, an alternative MIG wire feed adapter 270 (or 270A) an alternative MIG contact tip assembly 290, and an alternative TIG gas nozzle 280 and blind nut 287. This affords great flexibility at relatively little expense, as compared with prior techniques wherein the user would have had to stock three entirely different welding torch assemblies in order to conduct PAW, TIG, and MIG welding, and even then would have had to completely disconnect one welding system from the utilities in order to replace it with another.

The present invention has also provided a unique docking system for PAW welding which permits replacement or repair of the nozzle assembly without movement of the torch with respect to an associated robotic mount and without disconnection thereof from associated utilities, a facility which has heretofore not been available with PAW welding. In this regard, the present invention provides a unique docking assembly which incorporates a fluid-cooled output fixture which constitutes the inner body of a PAW welding torch, and a water-cooled plasma nozzle for ready mounting and demounting relative to the docking assembly without the use of tools and without utilities disconnection or water leakage.

I claim:

1. In a plasma arc welding system including a tip assembly for guiding an elongated metal electrode toward an associated workpiece at a welding station and applying welding voltage to the electrode, a nozzle assembly surrounding the tip assembly for channeling a plasma gas and a shielding gas relative to the welding arc, and utilities delivery means for delivering to the welding station utilities such as welding voltage, arc plasma gas, arc shielding gas, and metal electrode, a quick connect and disconnect docking assembly comprising: a docking body disposed at the welding station and having utilities passages therethrough, means connecting said docking body to the associated utilities delivery means and receiving the electrode and the plasma and shielding gases into said passages, an output fixture carried by said docking body and communicating with selected ones of said passages for directing the electrode and plasma gas from said docking body, means on said output fixture for removably mounting the tip assembly thereon in a use configuration receiving the electrode with said output fixture providing an electrical connection between said docking body and the tip assembly, first coupling means on said docking body, second coupling means non-removably mounted on the nozzle assembly, said first and second coupling means being manually removably engageable with each other without the use of tools for mounting the nozzle assembly on said docking body in a mounted condition in surrounding relationship with the tip assembly and in communication with at least one other passage for receiving the plasma gas and the shielding gas, and means electrically insulating said docking body from the nozzle assembly, whereby the nozzle assembly can readily be mounted and demounted at the welding station without affecting the utilities delivery means upstream of the welding station.

2. The docking assembly of claim 1, wherein said connecting means delivers the electrode and the plasma gas respectively into first and second passages, said docking body including channel means internally thereof providing communication between said first and second passages so that said plasma gas exits said docking body from said first passage.

3. The docking assembly of claim 1, wherein the shielding gas exits said docking body externally of said output fixture.

4. The docking assembly of claim 1, wherein the utilities delivery means delivers cooling fluid to the welding station, said docking body including cooling fluid passages therethrough, said cooling fluid passages being disposed in communication with the nozzle assembly in its mounted condition for circulating cooling fluid through the nozzle assembly.

5. The docking assembly of claim 4, wherein said docking body further includes valve means disposed in said cooling fluid passages for movement between a normal closed condition preventing flow of cooling fluid therethrough and an open condition permitting flow of cooling fluid therethrough, bias means resiliently urging said valve means to the closed condition thereof, and actuator means carried by the nozzle assembly for actuating said valve means to the open condition thereof when the nozzle assembly is in the mounted condition thereof.

6. The docking assembly of claim 5, wherein said docking body has a longitudinal axis, at least one of said cooling fluid passages having a lateral portion extending generally perpendicular to said axis.

7. The docking assembly of claim 1, wherein said first coupling means includes a threaded portion on said docking body and said second coupling means includes a member threadedly engageable with said threaded portion.

8. The docking assembly of claim 1, wherein said first coupling means includes receptacle means communicating with ones of said passages other than said selected ones, said second coupling means including plug-type fittings receivable in said receptacle means.

9. In a docking apparatus for coupling a welding nozzle assembly to utilities supplies in an arc welding system, including a docking body having a plurality of passages extending therethrough, a plurality of input connectors carried by the body adjacent to one end thereof and respectively communicating with the passages and adapted for coupling to the utilities supplies, an output fixture carried by the body at the other end thereof and communicating with one of the passages for receiving utilities, and coupling means on the body at the other end thereof for coupling the nozzle assembly thereto, the improvement comprising: channel means disposed internally of the docking body and providing communication between the one passage and a plurality of others of the passage.

10. The docking apparatus of claim 9, wherein said channel means provides communication between the one passage and two other passages.

11. The docking apparatus of claim 10, wherein said channel means provides communication between the one passage and three other passages.

12. The docking apparatus of claim 11, wherein said channel means includes a first channel providing communication between the one passage and a first other passage adjacent to the other end of the docking body, and a second channel providing communication between the one passage and second and third other passages intermediate the ends of the docking body.

13. The docking apparatus of claim 9, wherein the docking body has a longitudinal axis, the one passage extending axially of the docking body.

14. The docking apparatus of claim 9, and further comprising valve means disposed in two of said other passages for movement between a normal closed condition preventing fluid flow therethrough and an open condition permitting fluid flow therethrough.

15. The docking apparatus of claim 9, wherein the docking body is of unitary one-piece construction.

16. In an arc welding system including a tip assembly for guiding an elongated metal electrode toward an associated workpiece at a welding station and applying welding voltage to the electrode, a nozzle assembly surrounding the tip assembly for channeling gas relative to the welding arc, and utilities delivery means for delivering to the welding station utilities such as welding voltage, gas, electrode and cooling fluid, a quick connect and disconnect docking assembly comprising: a docking body disposed at the welding station and having utilities passages therethrough, means connecting said docking body to the associated utilities delivery means and receiving the electrode and the fluid utilities into said passages, an output fixture carried by said docking body and communicating with selected ones of said passages for passing the electrode and gas from said docking body, cavity means in said output fixture communicating with others of said passages for circulating cooling fluid within said output fixture, means on said output fixture for removably mounting the tip assembly thereon in a use configuration receiving the electrode with said output fixture providing an electrical connection between said docking body and the tip assembly, first coupling means on said docking body, second coupling means non-removably mounted on the nozzle assembly, said first and second coupling means being manually removably engageable with each other without the use of tools for mounting the nozzle assembly on said docking body in a mounted condition in surrounding relationship with the tip assembly for receiving the gas, and means electrically insulating said docking body from the nozzle assembly in its mounted condition, whereby the nozzle assembly can readily be mounted and demounted at the welding station without affecting the utilities delivery means upstream of the welding-station.

17. The docking assembly of claim 16, wherein said cavity means includes two elongated channels communicating with said others of said passages and respectively extending along opposite sides of said output fixture, and an annular portion disposed adjacent to the distal end of said output fixture and providing communication between said channels.

18. The docking assembly of claim 17, wherein said output fixture includes inner and outer tubular bodies disposed one within the other and cooperating to define said cavity means.

19. The docking assembly of claim 18, wherein said output fixture and said cavity means therein extend into one of said selected ones of said passages, said docking body including channel means providing communication between said others of said passages and said one passage at the inner end of said cavity means for circulating cooling fluid through said cavity means.

20. The docking assembly of claim 11, wherein the utilities delivery means delivers shielding gas and plasma gas to the welding station, said output fixture communicating with said selected ones of said passages for passing plasma gas from said docking body, said docking body further including a passage for receiving shielding gas from the utilities delivery means and passing it from said docking body externally of said output fixture.

21. The docking assembly of claim 16, wherein said docking body includes channel means providing communication between said selected ones of said passages for delivering gas into said output fixture.

22. A nozzle for use with a plasma arc welding assembly including a shielding gas delivery port and an output fixture for delivering plasma gas and carrying a contact tip assembly for guiding an elongated metal electrode toward an associated workpiece and applying welding voltage to the electrode, said nozzle comprising: an elongated tubular inner body defining a first passage extending between an inlet end and a working end, an elongated tubular outer body coaxially surrounding said inner body and coupled thereto and cooperating therewith to define therebetween an annular second passage extending between said inlet end and said working end, coupling means for removably coupling said nozzle to the arc welding assembly in a mounted condition wherein the output fixture is received in said first passage with said contact tip assembly disposed adjacent to said working end, and transfer means communicating with said second passage and adapted for communication with the delivery port when said nozzle is disposed in its mounted condition for delivering said shielding gas to said working end.

23. The nozzle of claim 22, and further comprising means electrically insulating nozzle in its mounted condition from the associated arc welding assembly.

24. The nozzle of claim 23, wherein said insulating means includes sleeve means disposed within said inner body and electrically insulating said inner body from the output fixture.

25. The nozzle of claim 22, and further comprising an elongated tubular intermediate body disposed coaxially between said inner and outer bodies for cooperation with said outer body to define said second passage, said intermediate body cooperating with said inner body to define a cooling fluid cavity there between, said transfer means including means communicating with said cavity and adapted for communication with associated cooling fluid means of the associated arc welding assembly when said nozzle is disposed in its mounted condition.

26. The nozzle of claim 25, wherein said cavity includes a pair of cooling fluid channels respectively formed along opposite sides of said inner body.

27. The nozzle of claim 26, wherein said transfer means includes three plug-type fittings respectively communicating with said second passage and said channels and adapted to be received respectively into female receptacles in the associated arc welding assembly.

28. The nozzle of claim 26, wherein said cavity further includes a peripheral portion adjacent to said working end of said inner body for providing communication between said channels.

29. The nozzle of claim 28, wherein said peripheral portion extends through said inner body, and further comprising a push-in constricting member telescopically receivable in said working end of said inner body for cooperation therewith to define said peripheral portion and shaped and dimensioned for constricting the flow of plasma gas from the output fixture, and stop means limiting the depth of insertion of said constricting member in said inner body.

30. The nozzle of claim 29, and further comprising seal means providing a fluid-tight seal between said inner body and said constricting member around said peripheral portion for preventing the escape of cooling fluid therefrom.

31. In an arc welding system including utilities delivery means for delivering to a welding station utilities including welding voltage, plasma and arc shielding gases, an elongated metal electrode and cooling fluid, a welding torch assembly convertible among plasma arc welding ("PAW"), tungsten inert gas ("TIG") arc welding and metal inert gas ("MIG") arc welding comprising: a utilities distribution body disposed at the welding station and having utilities passages therethrough; means connecting said body to the associated utilities delivery means and receiving the electrode and the fluid utilities into said passages; a fluid-cooled output fixture carried by said body and communicating with selected ones of said passages for circulating cooling fluid through said output fixture and for passing the electrode and plasma gas from said body; means on said output fixture for interchangeably mounting thereon any of a plurality of tip assemblies adapted for PAW, TIG and MIG welding in a use configuration receiving the electrode into the tip assembly with said output fixture cooperating with the tip assembly to provide an electrical connection between said body and the electrode; means on said body for interchangeably mounting any of a plurality of electrode feed assemblies adapted for PAW, TIG and MIG welding for advancing a metal electrode through said body and said output fixture and an associated tip assembly; a fluid-cooled nozzle carried by said body in surrounding relationship with said output fixture and the associated tip assembly and having a distal working end disposable in use adjacent to an associated workpiece and serving to channel plasma gas from said output fixture to said working end, said nozzle communicating with selected ones of said passages for circulating cooling fluid through said nozzle and for passing shielding gas to said working end; and means on said nozzle adjacent to said working end for interchangeably mounting any of a plurality of gas-directing assemblies adapted for PAW, TIG and MIG welding for directing gases relative to the arc.

32. The welding torch assembly of claim 31, wherein said nozzle has an axial bore therethrough accommodating said output fixture and the associate tip assembly, a pair of cooling fluid channels respectively formed along opposite sides of said nozzle, and a peripheral cavity portion adjacent to said working end and providing communication between said channels.

33. The welding torch assembly of claim 32, wherein said cavity portion extends through said nozzle to said axial bore, and further comprising a push-in gas directing member telescopically receivable in said nozzle at said working end for cooperation therewith to define said peripheral cavity portion and shaped and dimensioned for constricting the flow of plasma gas from said output fixture, and stop means limiting the depth of insertion of said gas-directing member in said nozzle.

34. The welding torch assembly of claim 33, and further comprising seal means providing a fluid-tight seal between said nozzle and said gas-directing member around said peripheral cavity portion for preventing the escape of cooling fluid therefrom.

35. The welding torch assembly of claim 31, and further comprising means electrically insulating said nozzle from said body and said output fixture and the associated tip assembly.

36. The welding torch assembly of claim 31, wherein said body includes valve means disposed in two of said utilities passages adapted for carrying cooling fluid for movement between a normal closed condition preventing flow of cooling fluid therethrough and an open condition permitting flow of cooling fluid therethrough.

37. The welding torch assembly of claim 31, and further comprising coupling means removably mounting said nozzle on said body.

38. The welding torch assembly of claim 37, wherein said coupling means includes a threaded portion on said body and a member non-removably mounted on said nozzle and threadedly engaged with said threaded portion.

39. The welding torch assembly of claim 38, wherein said coupling means includes receptacle means on said body and plug-type fittings on said nozzle receivable in said receptacle means.

* * * * *

UNITED STATES PATENT AND TRADEMARK OFFICE
CERTIFICATE OF CORRECTION

PATENT NO. : 5,258,599
DATED : November 2, 1993
INVENTOR(S) : Delford A. Moerke

It is certified that error appears in the above-identified patent and that said Letters Patent is hereby corrected as shown below:

Column 18, claim 9, line 68, "passage" should be --passages--.

Column 20, claim 23, line 45, after the word "insulating", insert --said--.

Column 22, claim 33, line 15, after the word "said", insert --peripheral--.

Signed and Sealed this

Twenty-fourth Day of May, 1994

Attest:

BRUCE LEHMAN

*Attesting Officer*     *Commissioner of Patents and Trademarks*